(12) United States Patent
Kube

(10) Patent No.: US 10,208,845 B2
(45) Date of Patent: Feb. 19, 2019

(54) DRIVE ARRANGEMENT

(71) Applicant: SIEMENS AKTIENGESELLSCHAFT, München (DE)

(72) Inventor: Andreas Kube, Aachen (DE)

(73) Assignee: Flender GmbH, Bocholt (DE)

( * ) Notice: Subject to any disclaimer, the term of this patent is extended or adjusted under 35 U.S.C. 154(b) by 272 days.

(21) Appl. No.: 15/012,431

(22) Filed: Feb. 1, 2016

(65) Prior Publication Data

US 2016/0223063 A1    Aug. 4, 2016

(30) Foreign Application Priority Data

Feb. 2, 2015   (EP) ..................................... 15153430

(51) Int. Cl.
| | |
|---|---|
| B02C 13/30 | (2006.01) |
| B02C 18/24 | (2006.01) |
| F16H 47/02 | (2006.01) |
| B02C 15/00 | (2006.01) |
| F16D 48/00 | (2006.01) |

(52) U.S. Cl.
CPC ........... *F16H 47/02* (2013.01); *B02C 15/006* (2013.01); *F16D 48/00* (2013.01); *B02C 2015/008* (2013.01)

(58) Field of Classification Search
CPC ................................. B02C 13/30; B02C 18/24
See application file for complete search history.

(56) References Cited

U.S. PATENT DOCUMENTS

| | | | | |
|---|---|---|---|---|
| 4,298,113 A | * | 11/1981 | Shaver .................... | B02C 17/24 192/103 F |
| 5,472,146 A | * | 12/1995 | Doppstadt ............... | B02C 13/04 241/101.76 |
| 7,559,495 B2 | * | 7/2009 | Coble ..................... | B02C 13/30 241/101.761 |
| 2003/0230655 A1 | | 12/2003 | Giberson et al. | |
| 2014/0021890 A1 | * | 1/2014 | Herrera ................... | B02C 25/00 318/375 |
| 2014/0238189 A1 | * | 8/2014 | Matosevic ............ | B02C 15/006 74/665 A |
| 2015/0336106 A1 | | 11/2015 | Klotzek et al. | |

(Continued)

FOREIGN PATENT DOCUMENTS

| | | |
|---|---|---|
| CN | 1111005 A | 11/1995 |
| CN | 1153549 A | 7/1997 |

(Continued)

OTHER PUBLICATIONS

K.-H. Grote und J. Feldhusen, Taschenbuch für den Maschinenbau, Dubbel, 23 edition, Berlin Heidelberg: publisher: Springer, 2011, ISBN 978-3-642-17305-9, p. G 69; 2011.

(Continued)

*Primary Examiner* — Tisha D Lewis
(74) *Attorney, Agent, or Firm* — Henry M. Feiereisen LLC

(57) ABSTRACT

A drive arrangement for driving a work machine includes a motor configured to generate a torque, and a transmission apparatus configured to transmit the torque from the motor to the work machine. The transmission apparatus includes a fluid coupling and at least one controllable torque transmitter configured to control transmission of the torque from the motor to the work machine.

18 Claims, 4 Drawing Sheets

(56) References Cited

U.S. PATENT DOCUMENTS

2015/0336107 A1 11/2015 Kube
2015/0349697 A1 12/2015 Kube
2015/0367353 A1 12/2015 Kube

FOREIGN PATENT DOCUMENTS

| CN | 102123793 A | 7/2011 | |
|---|---|---|---|
| CN | 202634175 U | 12/2012 | |
| CN | 202833872 U | 3/2013 | |
| DE | 202009016825 U1 | 4/2010 | |
| EP | 386699 A2 * | 3/1990 | ............... B26D 5/08 |
| EP | 2500100 A1 | 9/2012 | |
| WO | WO 2013/160220 A1 | 10/2013 | |

OTHER PUBLICATIONS

K.-H. Grote und J. Feldbusen, Taschenbuch für den Maschinenbau; Dubbel, 23 edition, Berlin Heidelberg: publisher: Springer, 2011, ISBN 978-3-642-17305-9, p. G 73; 2011.

* cited by examiner

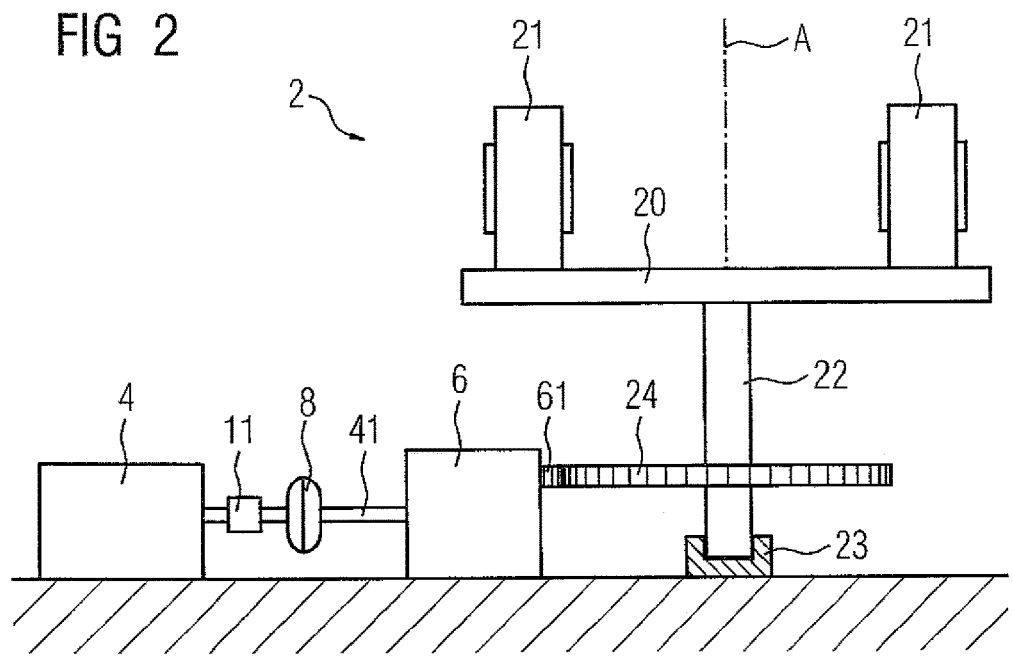
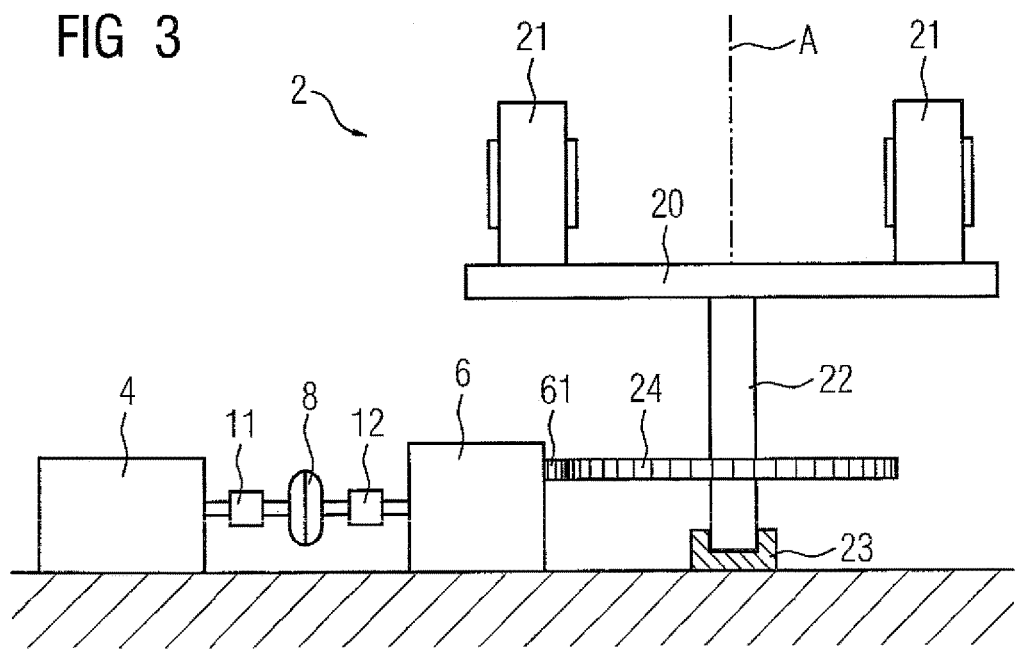

DRIVE ARRANGEMENT

CROSS-REFERENCES TO RELATED APPLICATIONS

This application claims the priority of European Patent Application, Serial No. 15153430.2, filed Feb. 2, 2015, pursuant to 35 U.S.C. 119(a)-(d), the disclosure of which is incorporated herein by reference in its entirety as if fully set forth herein.

BACKGROUND OF THE INVENTION

The present invention relates to a drive arrangement, in particular for a mill, and to a method for operating a drive arrangement.

The following discussion of related art is provided to assist the reader in understanding the advantages of the invention, and is not to be construed as an admission that this related art is prior art to this invention.

DE 202009016825 U1 describes a roller mill, which includes a housing, a grinding table with a grinding track and grinding rollers rolling on the grinding track, wherein during operation the grinding rollers can be disengaged. The roller mill also includes at least two drives with a motor and gearing, which drive the grinding table. In order to be able to equalize the design-related or also deliberately chosen differences in the properties of the drives, i.e. in the properties of the electric motors and the reduction gearing, a turbo coupling is assigned to at least one of the gearings, preferably to each gearing. The torque characteristic curve of the turbo couplings is selected such that the different properties of the drives are compensated so that each drive drives the grinding table with its nominal power.

A turbo coupling, also known under the term "fluid coupling" is a hydrodynamic coupling, in which in the entire operating range the power is transmitted hydrodynamically according to the Fottinger principle.

Fluid couplings heat up during operation, particularly during starting operations. It is possible here that a temperature reserve toward a maximum permissible temperature of the fluid coupling is too low for a possibly repeated starting operation of a drive, because the fluid coupling from a previous operation of the drive is heated again. The heat discharge from the fluid couplings to the ambient air generally takes place by means of convection. When the drive is stationary, there is only free convection and the fluid coupling requires a very long time, in some instances several hours, to cool down before a start of the drive, in particular a startup under high load, is possible again. Wait times resulting therefore indicate a loss in production and are unwanted.

It would therefore be desirable and advantageous to address these problems and to obviate other prior art shortcomings.

SUMMARY OF THE INVENTION

According to one aspect of the present invention, drive arrangement for driving a work machine includes a motor configured to generate a torque, and a transmission apparatus configured to transmit the torque from the motor to the work machine, the transmission apparatus including a fluid coupling and at least one controllable torque transmitter configured to control transmission of the torque from the motor to the work machine.

The motor may be an electric motor or use another source of power, e.g. in the form of a hydraulic motor.

A work machine is a driven machine, which receives energy in the form of mechanical work. It is the counterpart to the motor, i.e. a drive, which discharges mechanical energy. In interaction with the drive provided by the motor, the work machine can also be referred to as output. The work machine is connected to the motor via a transmission apparatus for mechanically transmitting the torque from the motor to the work machine. This is preferably a rotating shaft. However, other forms such as rod assembly, levers, cables and belts are also possible. The transmission apparatus can also include a single or multi-stage gear transmission, e.g. a bevel gear, a spur gear and/or a planetary gearbox. The motor and the transmission apparatus form a drive train.

The controllable torque transmitter which is integrated into the drive train is an apparatus for controlling the torque transmission between the motor and the work machine. Here the torque transmitter can either permit the torque transmission between the motor and the work machine or wholly or partially interrupt the same. Here the controller of the torque transmitter can be integrated into the torque transmitter itself or can be effected from the outside by a signal.

The controllable torque transmitter can be automatically switching, e.g. as a function of the effective direction of the torque. In this case the function of the torque transmitter is controlled by an operating parameter such as speed, torque or direction of rotation. It is also possible for the controllable torque transmitter to be switched externally, e.g. by an electromagnetic switch which is actuated by the operator of the system.

According to another advantageous feature of the present invention, the torque transmitter can include one or more couplings from the following group: an autoswitched coupling, in particular a free-wheel, an externally-switched coupling, in particular a multiple-disc coupling or a magnetic coupling.

A free-wheel is configured such that it transmits a torque required for the drive task of the work machine, but not an oppositely directed torque. A free-wheel is therefore torque-transmitting in a first effective direction and is not torque-transmitting in a second direction which opposes the first effective direction.

According to another advantageous feature of the present invention, the transmission apparatus can include the at least one controllable torque transmitter being provided in addition to the fluid coupling.

The one or several torque transmitters can be embodied as an autonomous component of the transmission apparatus; it is however also possible for one or several torque transmitters to be embodied integrated together with another component of the transmission apparatus, e.g. integrated together with the gearing or the fluid coupling in a shared housing.

According to another aspect of the present invention, a method for operating a drive arrangement for a work machine includes temporarily interrupting a torque transmission between a motor and a fluid coupling of the drive arrangement, and/or temporarily interrupting a torque transmission between the fluid coupling and the work machine. This may involve a complete or partial interruption in the torque transmission; in the latter case only part of the existing torque is transmitted.

The invention can be used advantageously for instance in a multiple point machine for vertical mills, such as are used for producing cement and for processing ore and coal, wherein the drive trains of the multiple point machine are equipped with fluid couplings. The system operators are confronted there with the problem that several motors have to be brought to a predetermined (nominal) speed under load ("start up the motors") and that heated fluid couplings have to cool down rapidly again.

A temporary interruption in the torque transmission between the fluid coupling and the work machine allows a fluid coupling to be operated without load by the motor. This results in a "ventilation" and thus a quicker cooling down of the fluid coupling than when the fluid coupling is stationary.

A temporary interruption in the torque transmission between the fluid coupling and the work machine allows a motor to be powered up without the load of the work machine. Only after a defined speed of the motor has been achieved will the torque transmission between the fluid coupling and the work machine be established, i.e. the motor is coupled to the work machine. A cooling of the fluid coupling is achieved at the same time by the load-free operation of the fluid coupling.

A temporary interruption in the torque transmission between the motor and the fluid coupling allows a motor to be powered up without the load of the work machine. Only after a defined speed of the motor has been achieved will the torque transmission between the motor and the fluid coupling be established, i.e. the motor is coupled to the work machine.

As described above, the at least one torque transmitter can include one or several couplings from the following group: an autoswitched coupling, in particular a free-wheel, an externally-switched coupling, in particular a multiple-disc coupling. Switchable couplings can be used to optionally to connect or separate parts of a drive train to/from one another. Opening and closing of the torque flow with the externally-switched couplings takes place on an external signal via mechanical, hydraulic, pneumatic or electromagnetic actuation. The provision of a multiple-disc coupling may be particularly advantageous as an automatically switching coupling and forms part of the force- (friction-) fit clutch couplings. Multiple-disc couplings are advantageous because despite their relatively small external dimensions they can transmit high torques through the parallel connection of a number of friction surfaces and are relatively cost-effective.

Autoswitched couplings are also referred to as automatically switching couplings and involve couplings having a switching process which is triggered by one of the operating parameters, speed, torque or direction of rotation. A direction-switched coupling is a particularly advantageous automatically switching coupling, also known as free-wheel. Free-wheels are advantageous because they are easily built and are relatively cost-effective.

It is also possible for a coupling which is to be functionally set up between the autoswitched and the externally-switched couplings to be used as a torque transmitter. A hydraulically supported free-wheel can be used for instance, i.e. a free-wheel which requires a hydraulic support in order to switch reliably. In this case, it is not possible to draw a clear separating line between autoswitched and externally-switched.

The transmission apparatus can have at least one controllable torque transmitter in addition to the fluid coupling. In principle the controllable torque transmitter can be realized by a fluid coupling with a changeable fill level, and thus a changeable torque transmission. This, however, causes relatively high costs and requires substantial installation space to accommodate additional units. It is therefore advantageous to provide the controllable torque transmitter as a component of the transmission apparatus which is separate from the fluid coupling.

According to another advantageous feature of the present invention, the torque transmitter can be arranged between the motor and the fluid coupling, or the torque transmitter can be arranged between the fluid coupling and the work machine. Advantageously, a first torque transmitter can be arranged between the motor and the fluid coupling, and a second torque transmitter can be arranged between the fluid coupling and the work machine. Each of these torque transmitters can hereby be automatically switching or externally-switched.

According to yet another aspect of the present invention, a work machine, in particular a vertical mill, includes at least one drive arrangement which includes a motor configured to generate a torque, and a transmission apparatus configured to transmit the torque from the motor to the work machine, the transmission apparatus including a fluid coupling and at least one controllable torque transmitter configured to control transmission of the torque from the motor to the work machine.

The work machine can have two or more drive arrangements, i.e. it can be a multiple point machine. The multiple point machine can be configured to be actively or passively redundant. It is advantageous here for the interruptions in production in the work machine required to cool down the fluid coupling to be significantly shortened compared with conventional work machines.

According to another advantageous feature of the present invention, when the torque transmission is interrupted between the motor and the fluid coupling by separating the motor from the fluid coupling and the work machine, the method can include the following steps: powering up the motor to a predetermined speed, re-establishing the torque transmission between the motor and the fluid coupling, when the motor runs at the predetermined speed, and driving the work machine by using a torque transmission from the motor via a transmission apparatus to the work machine. Advantageously, the predetermined speed can be predetermined by both a design-dependent specification and also by a specification of the system operator.

The present invention can be used particularly advantageously in vertical mills having a multiple point machine which are used in a fixed speed variant, i.e. without frequency converters, in which fluid couplings with a constant fill level are used. The motors provided, e.g. squirrel-cage rotor asynchronous machines, can only be started consecutively without additional current-limiting functional units, since the startup current is otherwise generally too high. As a result, the startup torque available is minimal in respect of the nominal torque of the overall system, which results in a slower start-up of the overall system. With difficult starting situations on account of the persistent load situation, this results in the fluid couplings heating up significantly, which restricts the possible duration of this stress on each individual drive train. With a higher number of drive trains, e.g. four or more, it may therefore be that heated drive trains already have to be switched off again during the start-up so as not to overheat. The result is that the overall drive torque achieved remains restricted, both in terms of level and also in terms of time. In some instances the drive torque is not sufficient to start the system.

This problem can be addressed by using a switchable torque transmitter, in particular a coupling, e.g. a multiple-disc coupling, between the motor and the fluid coupling. By disengaging the motor, i.e. interrupting the torque transmission between the motor and the fluid coupling, the motor can accelerate freely without power from the fluid coupling being received. The fluid coupling is as a result not heated. Therefore, all motors of the multiple point machine can be successively brought to idle speed, without the energy network being loaded with excessive current intensities. When all motors of the multiple point machine are up to speed, the clutch couplings can be engaged simultaneously or according to a predetermined switching strategy. Therefore all drive trains in an optimal case simultaneously generate the drive torque, wherein the drive torque is not restricted in terms of level and its temporal availability is at a maximum.

A further advantage is that the characteristic curve of the fluid couplings in this variant need not be considerate of the startup behavior of the motor. The degree of efficiency can now be optimally defined, which improves the overall degree of efficiency of the drive and reduces the operating temperature of the fluid coupling. A further advantage is that the motor characteristic curves also need not be optimized to a high startup torque, which reduces motor costs and likewise improves the degree of efficiency.

According to another advantageous feature of the present invention, when the torque transmission is interrupted between the fluid coupling and the work machine by separating the motor from the work machine, the method includes the following steps: powering up the motor to a predetermined speed, re-establishing the torque transmission between the fluid coupling and the work machine, and driving the work machine by using a torque transmission from the motor via a transmission apparatus to the work machine.

There is thus the possibility of rotating the fluid coupling by the motor while the mill is stationary, and thus cooling the same. This takes place for instance when a switchable torque transmitter embodied as a free-wheel is arranged between the fluid coupling and the work machine, by the motor being started backwards. Since the fluid coupling in this case does not transmit any power to the work machine, the slip is almost zero and the heat generation in the fluid coupling is not significant. However the rotation causes the fluid coupling to "ventilate" and a large heat discharge takes place causing the fluid coupling to cool down rapidly and the system to be ready to start again. It is thus possible to dispense with further cooling measures, such as e.g. external fans and other cooling apparatuses for cooling down the fluid couplings.

Cooling of a fluid coupling can be improved still further when driving the fluid coupling by the motor without load to cool the fluid coupling, during or after powering up the motor.

A temporary interruption in the torque transmission between the fluid coupling and the work machine also allows a motor to be powered up without the load of the work machine. Only after a defined speed of the motor has been achieved will the torque transmission between the fluid coupling and the work machine be re-established, i.e. the motor is coupled to the work machine again. A cooling of the fluid coupling is achieved at the same time by the load-free operation of the fluid coupling.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is a sectional view of a drive arrangement for driving a vertical mill, in which a torque transmitter is arranged between the motor and the fluid coupling;

FIG. 3 is a sectional view of a drive arrangement for driving a vertical mill, in which a first torque transmitter is arranged between the motor and the fluid coupling and a second torque transmitter is arranged between the fluid coupling and the vertical mill;

DETAILED DESCRIPTION OF PREFERRED EMBODIMENTS

Figure 1:
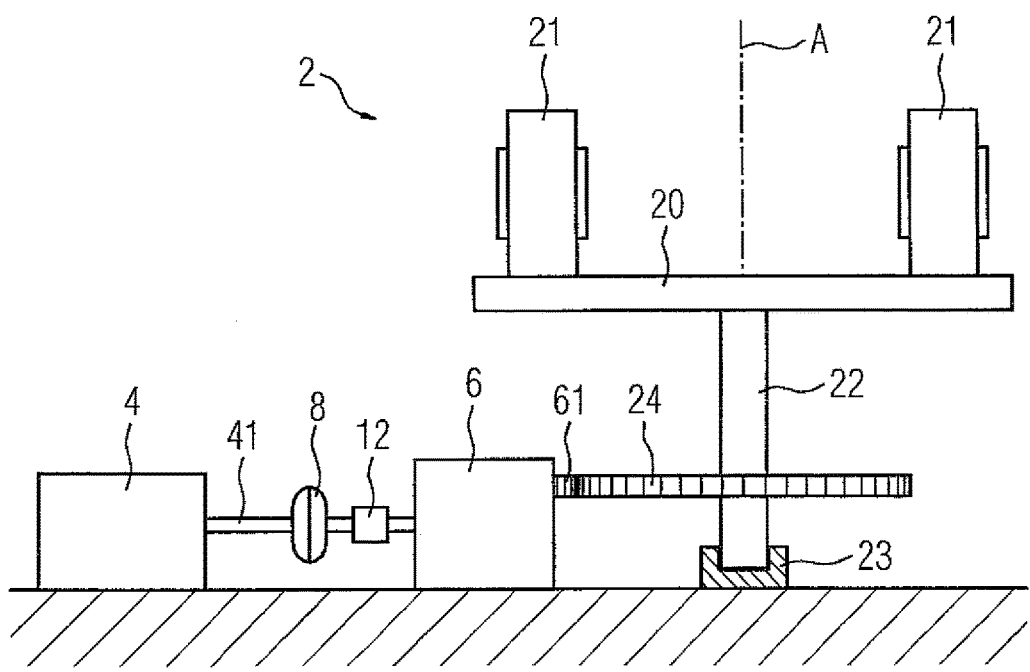
FIG. 1 is a sectional view of a drive arrangement for driving a vertical mill, in which a torque transmitter is arranged between the fluid coupling and the vertical mill.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of a drive arrangement for driving a vertical mill, generally designated by reference numeral 2. The drive arrangement includes a torque transmitter 12 and a fluid coupling 8, with the torque transmitter 12 being arranged between the fluid coupling 8 and the vertical mill 2.

The vertical mill 2 operates as a work machine and has a grinding table 20 which is rotatable about a vertical rotation axis A. A grinding track is embodied on the top side of the grinding table 20, upon which one or a number of grinding rollers 21 roll. The grinding table 20 is arranged in a torsion-resistant manner on a vertical upper end of a drive shaft 22 mounted in an axial bearing 23 and extending along the rotation axis A. A horizontally arranged gear rim 24 is arranged in a torsion-resistant manner on the shaft 22 below the grinding table 20. A drive arrangement, comprising a motor 4, a gearing 6 and a shaft 41 connecting the motor 4 and the gearing 6 serves to drive the drive shaft 22. The shaft 41 comprises a first part, namely a drive shaft of the motor 4, and a second part, a drive shaft of the gearing 6. Both parts are coupled by means of a fluid coupling 8. The motor 4 drives an output-side pinion 61 of the gearing 6 by way of the fluid coupling 8, said pinion 61 cogging with the gear rim 24.

A torque transmitter 12 is arranged between the fluid coupling 8 and the gearing 6. This can be an automatically switching coupling, e.g. a free-wheel, if necessary with hydraulic support, or an externally-switched coupling, e.g. an electromagnetically or hydraulically switched multiple-disc coupling.

During the milling operation, the torque of the motor 4 is transmitted via the shaft 41, the fluid coupling 8, the free-wheel 10 and the gearing 6 to the pinion 61 and the gear rim 24. A rotation of the motor 4 therefore results in a rotation of the grinding table 20 in the work direction of the mill 2. Since the fluid coupling 8 in this case transmits the motor power to the gearing 6, heat is generated in the fluid coupling 8 on account of the slip of the fluid coupling 8.

When operation of the mill 2 is now temporarily stopped, the fluid coupling 8 can be cooled down in this break of the drive by the torque transmission between the fluid coupling 8 and the mill 2 being temporarily interrupted and the fluid coupling 8 being rotated idling by the motor.

Since on account of the free-wheel 10 in this case the fluid coupling 8 transmits no power to the gearing 6, the slip of the fluid coupling 8 is almost zero and there is no significant heat generation in the fluid coupling 8. However, the rotation causes the fluid coupling 8 to "ventilate" and a large heat discharge from the fluid coupling 8 takes place so that the fluid coupling 8 essentially cools down more quickly than when stationary; as a result the drive is ready to start again relatively quickly.

In the case of the free-wheel, the motor 4 can be operated counter to the work direction of rotation, i.e. backwards. In the case of the detached multiple-disc coupling, the motor 4 can be operated in any direction, forwards or backwards.

In the event that the mill has to be started up from stationary, the switchable torque transmitter 12 is also advantageous. By the torque transmission between the fluid coupling 8 and the mill 2 being temporarily interrupted, the motor can be brought to a predetermined speed without load. Only after a defined speed of the motor has been achieved will the torque transmission between the fluid coupling and the work machine be re-established, i.e. the motor is coupled to the work machine again.

Figure 4:
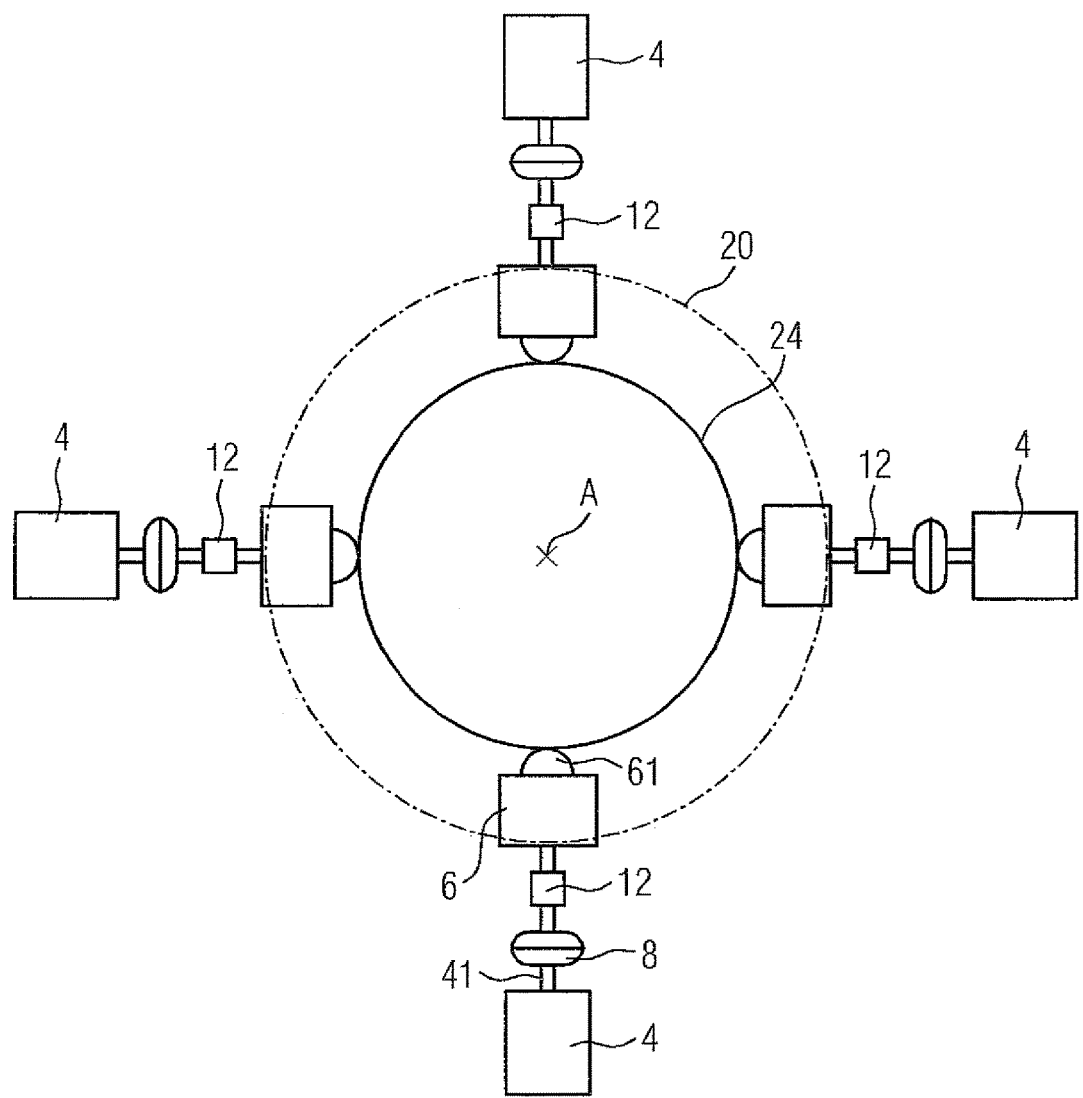
FIG. 4 is a top view onto a vertical mill having four drive arrangements.

This is particularly important when the mill has a number of drives, as shown in the exemplary embodiment shown in FIG. 4. The top view onto the vertical mill shows four drive arrangements arranged evenly around the mill axis A at the positions 0, 90, 180, and 270 degrees, each comprising an electric motor 4, a shaft 41, a fluid coupling 8, a switchable torque transmitter 12 and a gearing 6 with an output-side pinion 61. The output pinions 61 of the drive arrangements all cog with a shared gear rim 24, which is connected to a milling table 20 in a torsion-resistant manner.

In this case the motors 4 can generally not be accelerated at the same time, because this would result in the electricity-supply system becoming overloaded. Therefore, all motors 4 of the multiple point machine can be brought successively to idle speed, without the energy network being loaded with excessive current intensities. When all the motors 4 of the multiple point machine are up to speed, the clutch couplings 12 can be coupled simultaneously or according to a predetermined switching strategy. Therefore all drive trains in an optimal case simultaneously generate the drive torque, wherein the drive torque is not restricted in terms of level and its temporal availability is at a maximum.

FIG. 2 shows a section of a drive arrangement for driving a vertical mill, in which a torque transmitter 11 is arranged between the motor 4 and the fluid coupling 8. Besides the difference that the torque transmitter 11 is arranged between the motor 4 and the fluid coupling 8 in the exemplary embodiment in FIG. 2, and not between the fluid coupling and the vertical mill in the exemplary embodiment in FIG. 1, the exemplary embodiment in FIG. 2 corresponds to that in FIG. 1.

When a temporary interruption in the torque transmission between the motor 4 and the fluid coupling 8 is effected by means of the switchable torque transmitter 11, the motor 4 can be started up without the load of the work machine 2. Only after a defined speed of the motor 4 has been achieved will the torque transmission between the motor 4 and the fluid coupling 8 be re-established, i.e. the motor 4 is coupled to the work machine 2 again.

This is particularly important when the mill has a number of drives, which cannot be started up simultaneously, because this would result in the electricity-supply system becoming overloaded. Therefore, all motors of the multiple point machine can be successively brought to idle speed, without the energy network being loaded with excessive current intensities. When all motors of the multiple point machine are up to speed, the clutch couplings can be engaged simultaneously or according to a predetermined switching strategy. Therefore in an optimal case all the drive trains generate the drive torque simultaneously, wherein the drive torque is not restricted in terms of degree and its temporal availability is at a maximum.

FIG. 3 shows a section of a drive arrangement for driving a vertical mill, in which a first torque transmitter 11 is arranged between the motor 4 and the fluid coupling 8 and a second torque transmitter 11 is arranged between the fluid coupling 8 and the vertical mill 2. In this way the operator of the vertical mill 2 has complete freedom in terms of the manner in which he would like to perform the torque transmission, in order to achieve the afore-described advantageous technical effects.

Figure 5:
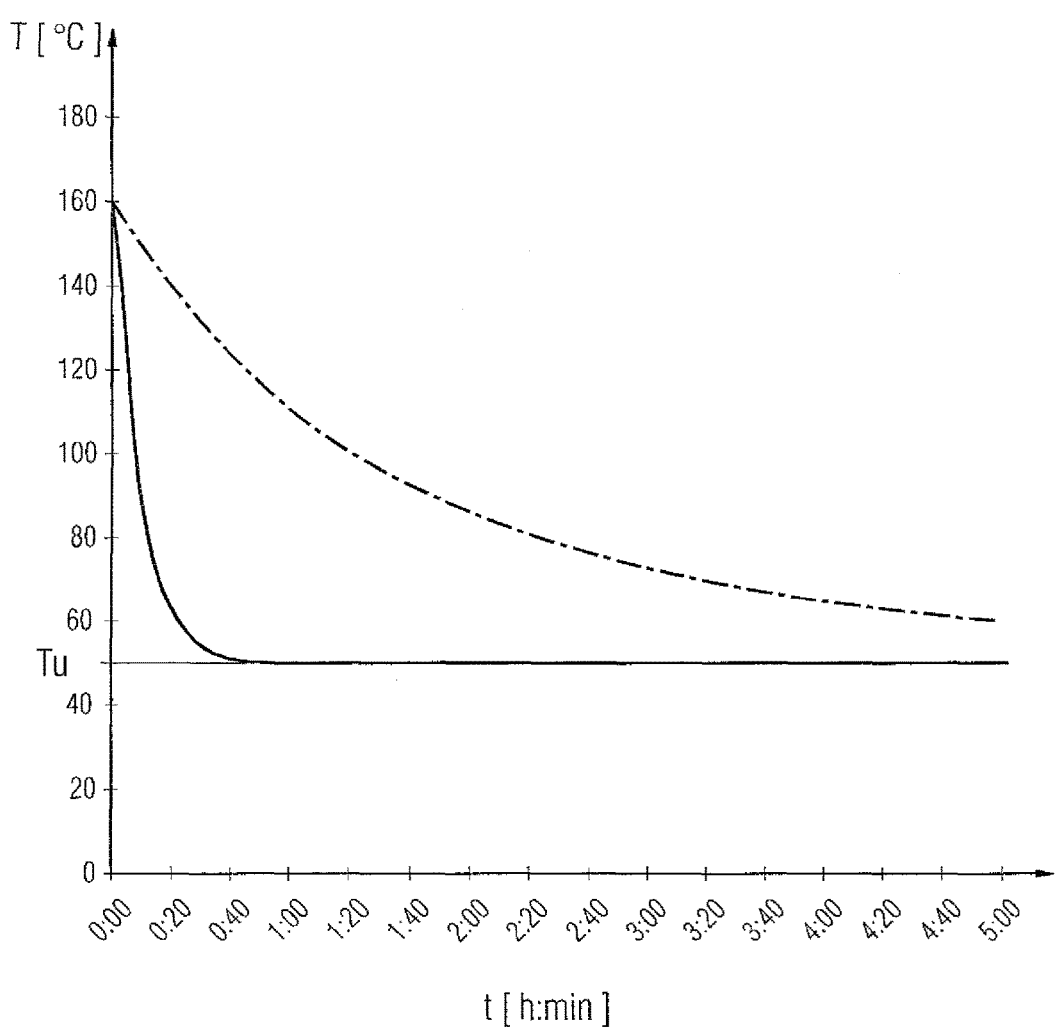
FIG. 5 is a graphical illustration of cooling curves of a stationary and a rotating fluid coupling, showing the temperature as a function of the time.

FIG. 5 shows a time-temperature diagram with cooling curves of a stationary fluid coupling and a rotating fluid coupling, which clarifies the temporal advantage which can be achieved by the invention. The time t is plotted in the unit hours h and minutes min from 0 to 5 hours to the right on the horizontal axis. The temperature is plotted in the unit degrees Celsius from 0 to 180° C. to the top on the vertical axis. The starting point of both curves is a fluid coupling heated to 160° C.

The dashed curve is the cooling curve of the stationary fluid coupling. The stationary fluid coupling cools down relatively slowly and even after five hours of cooling time has still not reached the ambient temperature Tu of 50° C.

The solid curve is the cooling curve of the rotating fluid coupling. The fluid coupling can be operated by the motor without load due to a temporary interruption in the torque transmission between the fluid coupling and the work machine, i.e. can be rotated. This results in a cooling "ventilation" of the fluid coupling. The load-free rotating fluid coupling cools down considerably faster than the stationary fluid coupling and has reached the ambient temperature Tu of 50° C. after approx. 50 minutes of cooling time.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A drive arrangement for driving a work machine, said drive arrangement comprising:
   a motor configured to generate a torque; and
   a transmission apparatus configured to transmit the torque from the motor to the work machine, said transmission apparatus including a fluid coupling and at least one controllable torque transmitter configured to control transmission of the torque from the motor to the work machine,
wherein the fluid coupling is cooled by load-free driving by the motor.

2. The drive arrangement of claim 1, wherein the at least one torque transmitter comprises at least one coupling selected from the group consisting of autoswitched coupling and externally-switched coupling.

3. The drive arrangement of claim 2, wherein the autoswitched coupling is a free-wheel.

4. The drive arrangement of claim 2, wherein the externally-switched coupling is a multiple-disc coupling.

5. The drive arrangement of claim 1, wherein the at least one torque transmitter is provided in addition to the fluid coupling.

6. The drive arrangement of claim 1, wherein the at least one torque transmitter is arranged between the motor and the fluid coupling.

7. The drive arrangement of claim 1, wherein the at least one torque transmitter is arranged between the fluid coupling and the work machine.

8. A work machine, comprising at least one drive arrangement which includes a motor configured to generate a torque, and a transmission apparatus configured to transmit the torque from the motor to the work machine, said transmission apparatus including a fluid coupling and at least one controllable torque transmitter configured to control transmission of the torque from the motor to the work machine, wherein the fluid coupling is cooled by load-free driving by the motor.

9. The work machine of claim 8, wherein the at least one torque transmitter comprises at least one coupling selected from the group consisting of autoswitched coupling and externally-switched coupling.

10. The work machine of claim 9, wherein the autoswitched coupling is a free-wheel.

11. The work machine of claim 9, wherein the externally-switched coupling is a multiple-disc coupling.

12. The work machine of claim 8, wherein the at least one torque transmitter is provided in addition to the fluid coupling.

13. The work machine of claim 8, wherein the at least one torque transmitter is arranged between the motor and the fluid coupling.

14. The work machine of claim 8, wherein the at least one torque transmitter is arranged between the fluid coupling and the work machine.

15. The work machine of claim 8, constructed in the form of a vertical mill.

16. The work machine of claim 8, further comprising at least one further said drive arrangement.

17. A method for operating a drive arrangement for a work machine, comprising:
    temporarily interrupting a torque transmission between a motor and a fluid coupling of the drive arrangement, or
    temporarily interrupting a torque transmission between the fluid coupling and the work machine,
    wherein the torque transmission is interrupted between the fluid coupling and the work machine by separating the motor from the work machine, and further comprising:
    powering up the motor to a predetermined speed;
    re-establishing the torque transmission between the fluid coupling and the work machine;
    driving the work machine by using a torque transmission from the motor via a transmission apparatus to the work machine; and
    driving the fluid coupling by the motor without load to cool the fluid coupling, during or after powering up the motor.

18. The method of claim 17, wherein the torque transmission is interrupted between the motor and the fluid coupling by separating the motor from the fluid coupling and the work machine, and further comprising:
    powering up the motor to a predetermined speed;
    re-establishing the torque transmission between the motor and the fluid coupling, when the motor runs at the predetermined speed; and
    driving the work machine by using a torque transmission from the motor via a transmission apparatus to the work machine.

* * * * *